United States Patent [19]

Anderson

[11] Patent Number: 4,947,024
[45] Date of Patent: Aug. 7, 1990

[54] WELDING APPARATUS COATED WITH SPATTER-RESISTANT AND ELECTRICALLY CONDUCTIVE FILM

[75] Inventor: Stephen L. Anderson, Traverse City, Mich.

[73] Assignee: Alcotec Wire Co., Traverse City, Mich.

[21] Appl. No.: 405,868

[22] Filed: Sep. 11, 1989

[51] Int. Cl.⁵ ............................................. B23K 9/26
[52] U.S. Cl. .......................... 219/137.61; 219/137.43; 219/137 R
[58] Field of Search .................. 219/137.61, 137.43, 219/137 R, 136

[56] References Cited

U.S. PATENT DOCUMENTS

| | | | |
|---|---|---|---|
| 3,239,648 | 3/1966 | Syrigos | 219/137.61 |
| 3,430,837 | 3/1969 | Hein | 228/53 |
| 3,590,212 | 6/1971 | Corrigall et al. | 219/137.43 |
| 4,450,341 | 5/1984 | Dietrick et al. | 219/137.52 |
| 4,575,612 | 3/1986 | Prunier | 219/137.43 |

Primary Examiner—Clifford C. Shaw
Attorney, Agent, or Firm—Glenn E. Klepac

[57] ABSTRACT

A welding contact tip or a weld nozzle is provided with a coating comprising a film of tungsten disulfide or other low friction material. The film provides resistance to weld spatter without interrupting electrical contact between the contact tip and electrode wire.

24 Claims, 1 Drawing Sheet

WELDING APPARATUS COATED WITH SPATTER-RESISTANT AND ELECTRICALLY CONDUCTIVE FILM

FIELD OF THE INVENTION

The present invention relates to a welding contact tip and a welding nozzle which are coated with a novel spatter-resistant and electrically conductive film. The novel film reduces friction between the contact tip and wire electrode, thereby enhancing efficiency of operation. In addition, the film reduces build-up of weld spatter.

BACKGROUND OF THE INVENTION

One of the difficulties involved with welding metal articles is that the process generates weld spatter which sticks to surfaces of various parts in the welding apparatus. Two parts particularly susceptible to deterioration by weld spatter are the contact tip and weld nozzle. When weld spatter gathers on an internal surface of the contact tip, it increases friction and reduces electrical contact with the wire electrode, thereby slowing operation. Spatter eventually causes the electrode discharge end of the contact tip to deteriorate and to have incidents (called "burn backs") wherein an electric arc extends back to the contact tip. These burn backs may interrupt operation by fusing the electrode wire with the contact tip and lead to frequent replacement of the contact tips, which adds expense by halting production and by increasing contact tip consumption.

Weld spatter also accumulates on interior and exterior surfaces of the weld nozzle. Accumulation of spattered metal on the interior surface reduces nozzle opening size, thereby perturbing gas flow over the weld arc. The spattered metal must be scraped frequently from the nozzle interior, also reducing efficiency of the welding operation. Eventually, spattered weld metal deteriorates the nozzle so severely that replacement is required.

In order to obviate the aforementioned difficulties, some ceramic coatings have been developed for welding apparatus in the prior art. However, such prior art coatings suffer from disadvantages which make them less than entirely suitable for their intended purpose.

Hein U.S. Pat. No. 3,430,837 discloses a welding tip including an inside coating that provides a non-stick surface. The coating comprises a high temperature ceramic or pyrolytic graphite or Teflon fluoropolymer.

Dietrick et al U.S. Pat. No. 4,450,341 claims a contact tip comprising a copper body and a wear-resistant member which may be formed of tool steel, metallic carbide alloys, or a ceramic composition.

Prunier U.S. Pat. No. 4,575,612 discloses a guide tube for an arc welding machine. The embodiment shown in FIG. 17 is a guide tube comprising a metal body having a longitudinal bore, the interior face of which is preferably provided with a protective layer of alumina. In a variation of Prunier's guide tube, this layer may be chromium dioxide.

Ceramic coatings utilized in the above-mentioned references simplify removal of weld spatter from metal parts. However, none of these coatings is sufficiently electrically conductive to allow utilization on internal surfaces of welding contact tips.

It is a principal objective of the present invention to provide a coating for welding apparatus comprising a film of a spatter-resistant, low friction, and electrically conductive substance.

A related objective of the present invention is to coat welding apparatus of the type described with a film that preferably comprises tungsten disulfide.

Additional objectives and advantages of the present invention will become apparent to persons skilled in the art from the following detailed description.

SUMMARY OF THE INVENTION

In accordance with the present invention, there is provided a welding contact tip comprising an elongated hollow metal body having an external surface and defining a longitudinal passageway with an internal surface. The metal body preferably comprises copper or a copper alloy. The passageway guides a wire electrode, preferably comprising an aluminum alloy or steel, from an electrode receiving end to an electroda discharge end. The weld wire may also be made from other metals useful in welding, such as copper and nickel.

A preferred apparatus also comprises a nozzle including a shield having a generally concave interior surface. The shield provides a conduit for a shielding gas and limits spatter of weld metal.

At least a portion of the external surface or internal surface of the contact tip is coated with a film of a low friction and spatter-resistant substance having good electrical conductivity. A coating of similar composition may also be provided on the shield. The film preferably comprises tungsten disulfide that is applied by chemical valor deposition.

The film preferably has an electrical resistivity of less than 30 microohm-cm, thermal conductivity of greater than about 0.05 cal/cm-sec° C, and a thickness of about 5000 angstroms or less.

The low friction substance may be a metal, preferably one with a melting point above 1100° C and electrical resistivity less than 15 microohm-cm. Some suitable metals include tungsten, molybdenum, chromium, nickel, osmium, palladium, platinum, and ruthenium. Metals having good resistance to oxidation upon heating in air are preferred. Optionally, the metal film should have a melting point above 1600° C, and electrical resistivity of less than about 10 microohm-cm. Tungsten is preferred because of its high melting point, low electrical resistivity, and resistance to oxidation at elevated temperatures.

The low friction substance may also be a sulfide, selenide, silicide, boride, nitride, or carbide of titanium, zirconium, tungsten, tantalum, vanadium, chromium, or hafnium. Such compounds include the sulfides of tungsten, titanium, and zirconium; titanium diselenide; silicides of tantalum, titanium, and vanadium; diborides of chromium, hafnium, titanium, vanadium, and zirconium; nitrides of titanium and zirconium; and tungsten carbide.

DETAILED DESCRIPTION OF A PREFERRED EMBODIMENT

Figure 1:
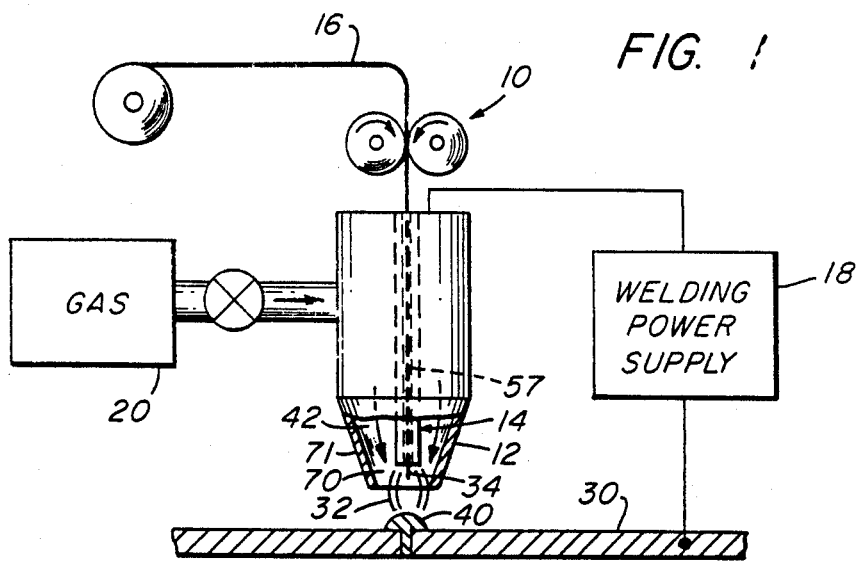
FIG. 1 is a schematic illustration of a preferred gas-metal arc welding apparatus coated with the improved film of the present invention.

There is shown in FIG. 1 a preferred gas-metal arc welding apparatus 10 having a contact tip and nozzle coated with a film of tungsten disulfide in accordance with the present invention. The apparatus 10 includes a hollow nozzle 12, a copper contact tip or contact tube 14 arranged concentrically within the nozzle 12, an electrode wire or weld wire 16 held in position by the contact tip 14, an electric power supply 18, and a gas source 20. The power supply 18 is electrically connected to the contact tip 14 and a metal workpiece 30. Activating the power supply 18 produces an electric arc 32 between the workpiece 30 and a tip 34 of the wire 16 forging a weld fillet 40 comprising molten metal from the wire 16. The gas sourc 20 generally supplies an inert gas such as argon to the nozzle chamber 42.

Figure 2:
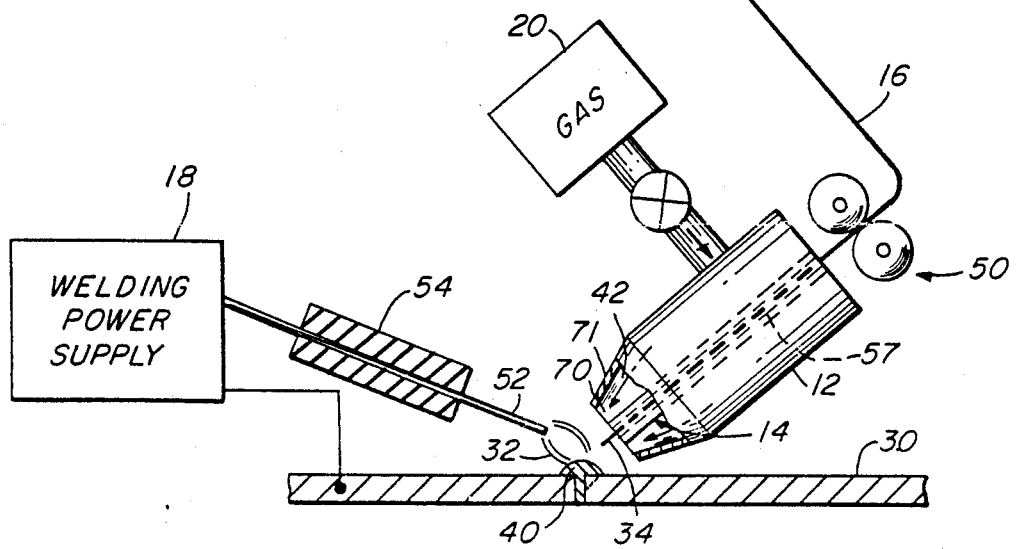
FIG. 2 is a schematic illustration of a gas-tungsten arc welding apparatus coated with the improved film of the present invention.

The gas-tungsten arc welding apparatus 50 shown in FIG. 2 also includes a nozzle 12, copper contact tip 14, electrode wire 16, electric power supply 18, and gas source 20 as in FIG. 1. However, the power supply 18 is connected to a tungsten electrode 52 through an insulated electrode holder 54. The apparatus 50 is activated by establishing an electrical connection through the electrode 52 and workpiece 30, thereby producing an arc 32 and melting metal from the wire 16 to form a weld fillet 40.

Figure 3:
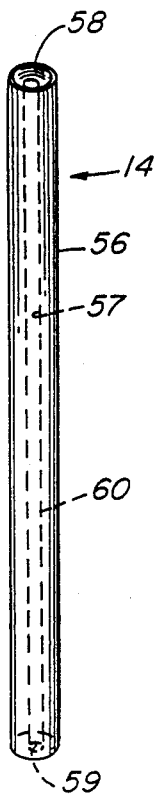
FIG. 3 is a perspective view of an improved welding contact tip made in accordance with the present invention.

The contact tip shown in FIGS. 1-3 comprises an elongated hollow copper body 14 having an external surface 56. The body 14 defines a longitudinal passageway 57 extending between an electrode receiving end 58 and an electrode discharge end 59. The receiving end 58 is countersunk with an enlarged opening to facilitate insertion of the weld wire 16. The remainder of the passageway 57 has a cylindrical shape with substantially constant diameter. A portion of the copper body 14 adjacent the passageway 57 comprises an internal surface 60 for guiding the wire 16 from the receiving end 58 to the discharge end 59. The internal surface 60 forms part of an electric circuit also including the wire 16 and power supply 18.

The improved contact tip 14 described and claimed herein has an internal surface 60 coated with a thin film of tungsten disulfide. The film is applied by chemical vapor deposition. The film on the internal surface 60 should have a thickness of less than about 5000 angstroms to minimize electrical resistance. A portion of the external surface 56 near the discharge end 59 is also coated with the film. The external surface 56 is left uncoated adjacent the receiving end 58 in order to minimize electrical resistance when the contact tip 14 is clamped into operating position. In the preferred tip 14 described herein, approximately one-half of the external surface 56 is coated with the film and approximately one-half is bare, uncoated copper. Thickness of the film on the external surface 56 is not critical.

The particularly preferred embodiment shown and described herein utilizes tungsten disulfide in a film thickness of approximately 1000 angstroms on the tip 14. The tungsten disulfide film may be applied in pure form or dispersed in a matrix of another refractory substance such as silicon carbide or titanium diboride. The pure form is preferred.

Contact tips coated with tungsten disulfide are found to have reduced coefficients of friction with aluminum and steel wire electrodes, thereby reducing force required to feed the wire through the passageway 57. Burn backs are also minimized. The film has good electrical conductivity and adequate heat transfer so that the contact tip is kept sufficiently cool for continuous operation. In the event of a burn back during welding, the film prevents fusion between the weld wire and tip so that work interruptions are avoided.

Referring now to FIGS. 1 and 2, the weld nozzle 12 has an interior surface 70 adjacent the chamber 42 and an exterior surface 71 away from the chamber 42. The interior surface 70 and exterior surface 71 are coated with a film of tungsten disulfide. Thickness of the film is not critical. The film may also comprise other spatter-resistant substances selected from the group consisting of sulfides of tungsten, titanium, and zirconium; tantalum diselenide; silicides of tantalum, titanium, and vanadium; diborides of chromium, hafnium, titanium, vanadium, and zirconium; nitrides of titanium and zirconium; and tungsten carbide. The film may also be a refractory metal, such as tungsten or molybdenum. The above-listed substances are sufficiently resistant to elevated temperatures that they avoid degradation in use.

A thin film of tungsten disulfide on the nozzle interior surface 70 and exterior surface 71 facilitates cleaning of weld spatter, either manually or with a wire brush. Accordingly, gas flow in the nozzle chamber 42 is smooth and arcing is avoided between the tip 14 and interior surface 70.

The spatter-resistant substances may be applied to the weld nozzle 12 and contact tip 14 in relatively pure form or in various mixtures with each other. If desired, solid lubricants such as graphite and molybdenum may be added to reduce friction. Electrical conductivity is enhanced in some instances by adding a dopant. For example, titanium diboride doped with boron is known to have better electrical conductivity than titanium diboride alone.

While the invention has been described in terms of preferred embodiments, the claims appended hereto are intended to encompass all embodiments which fall within the spirit of the invention.

What is claimed is:

1. A welding contact tip comprising:
   (a) an elongated hollow metal body having an external surface, said body defining a longitudinal passageway extending between an electrode receiving end and an electrode discharge end spaced longitudinally from said receiving end, a portion of said body adjacent said passageway comprising an internal surface for guiding a wire electrode along the length thereof; and
   (b) a coating on at least a portion of said external surface or said internal surface, said coating comprising a film of a spatter-resistant substance selected from the group consisting of sulfides, selenides, and carbides of tungsten, titanium, zirconium, tantalum, vandium, chromium, and hafnium; and a metal selected from the group consisting of tungsten, molybdenum, nickel, osmium, platinum, palladium, and ruthenium.

2. A welding contact tip as claimed in claim 1 wherein said coating covers a portion of said external surface adjacent said discharge end.

3. A welding contact tip as claimed in claim 1 wherein said coating covers at least a portion of said internal surface.

4. A welding contact tip as claimed in claim 3 wherein said film has an electrical resistivity of less than 15 microohm-cm at ambient temperature.

5. A welding contact tip as claimed in claim 1 wherein said film has a thermal conductivity of greater than about 0.05 cal/cm-sec° C at ambient temperature.

6. A welding contact tip as claimed in claim 1 wherein said film has a thickness of about 5000 angstroms or less.

7. A welding contact tip as claimed in claim 1 wherein said film is applied to the body by chemical vapor deposition.

8. A welding contact tip as claimed in claim 1 wherein said film comprises tungsten disulfide.

9. A welding contact tip as claimed in claim 1 wherein said film comprises tungsten.

10. A welding contact tip as claimed in claim 1 wherein said metal body comprises copper or a copper alloy.

11. A welding apparatus comprising the contact tip of claim 1 and:
(c) a metal nozzle extending around said contact tip radially outward thereof, said nozzle having a generally concave interior surface opposed to said contact tip and an exterior surface extending away from said contact tip; and
(d) a coating on at least a portion of said interior surface or said exterior surface, said coating comprising a film of a spatter-resistant substance selected from the group consisting of sulfides, selenides, silicides, borides, nitrides, and carbides of tungsten, titanium, zirconium, tantalum, vanadium, chromium, and hafnium and metals having a melting point above 1100° C and electrical resistivity of less than about 30 microohm-cm at ambient temperature.

12. The welding apparatus as claimed in claim 11 wherein said film comprises tungsten disulfide.

13. A nozzle for welding comprising:
(a) a shield having a generally concave interior surface and an exterior surface; and
(b) a coating on said interior surface comprising a film of a spatter-resistant substance selected from the group consisting of sulfides, selenides, and carbides of tungsten, titanium, zirconium, tantalum, vanadium, chromium, and hafnium; and a metal selected from the group consisting of tungsten, molybdenum, nickel, osmium, platinum, palladium, and ruthenium.

14. The nozzle as claimed in claim 13 wherein said film comprises tungsten disulfide.

15. A method of welding comprising:
(a) providing a welding apparatus comprising an electric power supply and a contact tip comprising a hollow metal body defining a longitudinal passageway extending between an electrode receiving end and an electrode discharge end, a portion of said body adjacent said passageway comprising an internal surface;
(b) coating said internal surface by chemical vapor deposition with a film of an electrically conductive substance selected from the group consisting of sulfides, selenides, silicides, borides, nitrides, and carbides of tungsten, titanium, zirconium, tantalum, vanadium, chromium, and hafnium and metals having a melting point above 1100° C and electrical resistivity of less than about 30 microohm-cm at ambient temperature; and
(c) guiding a wire electrode through said passageway.

16. The method of welding as claimed in claim 15 wherein said wire electrode is in electrical contact with said internal surface, said method further comprising:
(d) passing an electric current through said wire electrode.

17. The method of welding as claimed in claim 15 wherein said contact tip further comprises an external surface, said method further comprising:
(e) coating said external surface with a film of a substance selected from the group consisting of sulfides, selenides, silicides, borides, nitrides, and carbides of tungsten, titanium, zirconium, tantalum, vanadium, chromium, and hafnium and metals having a melting point above 1100° C and electrical resistivity of less than about 30 microohm-cm at ambient temperature.

18. The method of welding as claimed in claim 15 wherein said wire electrode comprises an aluminum alloy or steel.

19. The method of welding as claimed in claim 15 wherein said film comprises tungsten disulfide.

20. A welding contact tip comprising:
(a) an elongated hollow metal body defining a longitudinal passageway extending between an electrode receiving end and an electrode discharge end spaced longitudinally from said receiving end, a portion of said body adjacent said passageway comprising an internal surface for guiding a wire electrode along the length thereof; and
(b) a coating on at least a portion of said internal surface, said coating comprising a film of a spatter-resistant substance having an electrical resistivity of less than about 30 microohm-cm at ambient temperature, said substance being selected from the group consisting of sulfides, selenides, silicides, borides, nitrides, and carbides of tungsten, titanium, zirconium, tantalum, vanadium, chromium, and hafnium; and metals having a melting point above 1100° C.

21. A welding contact tip as claimed in claim 20 wherein said film has an electrical resistivity of less than about 15 microohm-cm at ambient temperature.

22. A welding contact tip as claimed in claim 20 wherein said film is applied to the internal surface by chemical vapor deposition.

23. A welding contact tip as claimed in claim 20 wherein said film has a thickness of about 5000 angstroms or less.

24. A welding contact tip as claimed in claim 20 wherein said metal body comprises copper or a copper alloy.

* * * * *